(12) United States Patent
Monahan (10) Patent No.: US 10,542,372 B2
(45) Date of Patent: Jan. 21, 2020

(54) USER IDENTIFICATION WITHIN A PHYSICAL MERCHANT LOCATION THROUGH THE USE OF A WIRELESS NETWORK

(75) Inventor: Scott P. Monahan, Atlanta, GA (US)

(73) Assignee: QUALCOMM Incorporated, San Diego, CA (US)

( * ) Notice: Subject to any disclaimer, the term of this patent is extended or adjusted under 35 U.S.C. 154(b) by 844 days.

(21) Appl. No.: 13/048,060

(22) Filed: Mar. 15, 2011

(65) Prior Publication Data

US 2012/0239500 A1 Sep. 20, 2012

(51) Int. Cl.
| | |
|---|---|
| *G06Q 30/02* | (2012.01) |
| *H04W 4/021* | (2018.01) |
| *G01S 5/02* | (2010.01) |
| *G01S 5/00* | (2006.01) |
| *H04L 29/08* | (2006.01) |
| *H04W 64/00* | (2009.01) |
| *H04W 4/21* | (2018.01) |
| *H04W 84/12* | (2009.01) |

(52) U.S. Cl.
CPC ........... *H04W 4/021* (2013.01); *G01S 5/0036* (2013.01); *G01S 5/0252* (2013.01); *G06Q 30/02* (2013.01); *H04L 67/26* (2013.01); *H04W 4/21* (2018.02); *H04W 64/00* (2013.01); *H04W 84/12* (2013.01)

(58) Field of Classification Search
USPC .................... 455/522.1, 522.114; 705/14, 26
See application file for complete search history.

(56) References Cited

U.S. PATENT DOCUMENTS

| | | | |
|---|---|---|---|
| 4,006,477 A | 2/1977 | Yost, Jr. et al. |
| 5,382,957 A | 1/1995 | Blume |
| 5,687,169 A | 11/1997 | Fullerton |
| 5,764,696 A | 6/1998 | Barnes et al. |

(Continued)

FOREIGN PATENT DOCUMENTS

| | | |
|---|---|---|
| CN | 1432949 A | 7/2003 |
| CN | 1633660 A | 6/2005 |

(Continued)

OTHER PUBLICATIONS

Lester, J et al., ""Are You With Me?"—Using Accelerometers to Determine if Two Devices are Carried by the Same Person", LNCS, Pervasive Computing, Apr. 2004,vol. 3001, pp. 33-50.

(Continued)

*Primary Examiner* — Afaf Osman Bilal Ahmed
(74) *Attorney, Agent, or Firm* — W&T/Qualcomm (57) ABSTRACT

A method and system are described for determining a location of a consumer within a retail establishment, or other geographical proximity. The method and system use a portable computing device ("PCD") such as, but not limited to, a mobile phone. The system and method may leverage existing infrastructure, such as wireless routers, to assist the PCD and a remote server in communication with the PCD to determine a location of a consumer in possession of the PCD within a retail location. The system may comprise a PCD running a geo-network discovery ("GND") module, a server running a service set identifier ("SSID") verification and rules ("V/R") module, a telecommunications network, and a wireless router configured to broadcast a unique SSID.

24 Claims, 6 Drawing Sheets

(56) References Cited

U.S. PATENT DOCUMENTS

| | | |
|---|---|---|
| 5,812,081 A | 9/1998 | Fullerton |
| 5,832,035 A | 11/1998 | Fullerton |
| 5,907,427 A | 5/1999 | Scalora et al. |
| 5,952,956 A | 9/1999 | Fullerton |
| 5,960,031 A | 9/1999 | Fullerton et al. |
| 5,963,581 A | 10/1999 | Fullerton et al. |
| 5,969,663 A | 10/1999 | Fullerton et al. |
| 5,970,148 A | 10/1999 | Meier |
| 5,995,534 A | 11/1999 | Fullerton et al. |
| 6,025,795 A | 2/2000 | Hulderman et al. |
| 6,031,862 A | 2/2000 | Fullerton et al. |
| 6,091,374 A | 7/2000 | Barnes |
| 6,111,536 A | 8/2000 | Richards et al. |
| 6,133,876 A | 10/2000 | Fullerton et al. |
| 6,177,903 B1 | 1/2001 | Fullerton et al. |
| 6,218,979 B1 | 4/2001 | Barnes et al. |
| 6,295,019 B1 | 9/2001 | Richards et al. |
| 6,297,773 B1 | 10/2001 | Fullerton et al. |
| 6,300,903 B1 | 10/2001 | Richards et al. |
| 6,304,623 B1 | 10/2001 | Richards et al. |
| 6,332,193 B1 | 12/2001 | Glass et al. |
| 6,351,652 B1 | 2/2002 | Finn et al. |
| 6,354,946 B1 | 3/2002 | Finn |
| 6,400,307 B2 | 6/2002 | Fullerton et al. |
| 6,400,329 B1 | 6/2002 | Barnes |
| 6,421,389 B1 | 7/2002 | Jett et al. |
| 6,430,208 B1 | 8/2002 | Fullerton et al. |
| 6,437,756 B1 | 8/2002 | Schantz |
| 6,462,701 B1 | 10/2002 | Finn |
| 6,466,125 B1 | 10/2002 | Richards et al. |
| 6,469,628 B1 | 10/2002 | Richards et al. |
| 6,483,461 B1 | 11/2002 | Matheney et al. |
| 6,489,893 B1 | 12/2002 | Richards et al. |
| 6,492,904 B2 | 12/2002 | Richards |
| 6,492,906 B1 | 12/2002 | Richards et al. |
| 6,501,393 B1 | 12/2002 | Richards et al. |
| 6,504,483 B1 | 1/2003 | Richards et al. |
| 6,512,455 B2 | 1/2003 | Finn et al. |
| 6,512,488 B2 | 1/2003 | Schantz |
| 6,519,464 B1 | 2/2003 | Santhoff et al. |
| 6,529,568 B1 | 3/2003 | Richards et al. |
| 6,538,615 B1 | 3/2003 | Schantz |
| 6,539,213 B1 | 3/2003 | Richards et al. |
| 6,549,567 B1 | 4/2003 | Fullerton |
| 6,552,677 B2 | 4/2003 | Barnes et al. |
| 6,556,621 B1 | 4/2003 | Richards et al. |
| 6,560,463 B1 | 5/2003 | Santhoff |
| 6,571,089 B1 | 5/2003 | Richards et al. |
| 6,573,857 B2 | 6/2003 | Fullerton et al. |
| 6,577,691 B2 | 6/2003 | Richards et al. |
| 6,585,597 B2 | 7/2003 | Finn |
| 6,593,886 B2 | 7/2003 | Schantz |
| 6,606,051 B1 | 8/2003 | Fullerton et al. |
| 6,611,234 B2 | 8/2003 | Fullerton et al. |
| 6,611,811 B1 | 8/2003 | Deaton et al. |
| 6,614,384 B2 | 9/2003 | Hall et al. |
| 6,614,387 B1 | 9/2003 | Deadman |
| 6,621,462 B2 | 9/2003 | Barnes |
| 6,636,566 B1 | 10/2003 | Roberts et al. |
| 6,636,567 B1 | 10/2003 | Roberts et al. |
| 6,636,573 B2 | 10/2003 | Richards et al. |
| 6,642,903 B2 | 11/2003 | Schantz |
| 6,650,894 B1 | 11/2003 | Berstis et al. |
| 6,661,342 B2 | 12/2003 | Hall et al. |
| 6,667,724 B2 | 12/2003 | Barnes et al. |
| 6,670,909 B2 | 12/2003 | Kim |
| 6,671,310 B1 | 12/2003 | Richards et al. |
| 6,674,396 B2 | 1/2004 | Richards et al. |
| 6,677,796 B2 | 1/2004 | Brethour et al. |
| 6,700,538 B1 | 3/2004 | Richards |
| 6,710,736 B2 | 3/2004 | Fullerton et al. |
| 6,717,992 B2 | 4/2004 | Cowie et al. |
| 6,748,040 B1 | 6/2004 | Johnson et al. |
| 6,750,757 B1 | 6/2004 | Gabig, Jr. et al. |
| 6,759,948 B2 | 7/2004 | Grisham et al. |
| 6,760,387 B2 | 7/2004 | Langford et al. |
| 6,762,712 B2 | 7/2004 | Kim |
| 6,763,057 B1 | 7/2004 | Fullerton et al. |
| 6,763,282 B2 | 7/2004 | Glenn et al. |
| 6,774,764 B2 | 8/2004 | Ghosh et al. |
| 6,774,846 B2 | 8/2004 | Fullerton et al. |
| 6,774,859 B2 | 8/2004 | Schantz et al. |
| 6,778,603 B1 | 8/2004 | Fullerton et al. |
| 6,781,530 B2 | 8/2004 | Moore |
| 6,782,048 B2 | 8/2004 | Santhoff |
| 6,788,730 B1 | 9/2004 | Richards et al. |
| 6,822,604 B2 | 11/2004 | Hall et al. |
| 6,823,022 B1 | 11/2004 | Fullerton et al. |
| 6,836,223 B2 | 12/2004 | Moore |
| 6,836,226 B2 | 12/2004 | Moore |
| 6,844,816 B1 | 1/2005 | Melton et al. |
| 6,845,253 B1 | 1/2005 | Schantz |
| 6,847,675 B2 | 1/2005 | Fullerton et al. |
| 6,862,575 B1 | 3/2005 | Anttila et al. |
| 6,879,878 B2 | 4/2005 | Glenn et al. |
| 6,882,301 B2 | 4/2005 | Fullerton |
| 6,895,034 B2 | 5/2005 | Nunally et al. |
| 6,895,236 B2 | 5/2005 | Shuster |
| 6,898,434 B2 | 5/2005 | Pradhan et al. |
| 6,900,732 B2 | 5/2005 | Richards |
| 6,906,625 B1 | 6/2005 | Taylor et al. |
| 6,907,244 B2 | 6/2005 | Santhoff et al. |
| 6,907,270 B1 | 6/2005 | Blanz |
| 6,912,240 B2 | 6/2005 | Kumar et al. |
| 6,914,949 B2 | 7/2005 | Richards et al. |
| 6,917,284 B2 | 7/2005 | Griffith et al. |
| 6,919,838 B2 | 7/2005 | Santhoff |
| 6,922,166 B2 | 7/2005 | Richards et al. |
| 6,922,177 B2 | 7/2005 | Barnes et al. |
| 6,925,109 B2 | 8/2005 | Richards et al. |
| 6,933,882 B2 | 8/2005 | Fullerton |
| 6,937,639 B2 | 8/2005 | Pendergrass et al. |
| 6,937,663 B2 | 8/2005 | Jett et al. |
| 6,937,667 B1 | 8/2005 | Fullerton et al. |
| 6,937,674 B2 | 8/2005 | Santhoff et al. |
| 6,947,492 B2 | 9/2005 | Santhoff et al. |
| 6,950,485 B2 | 9/2005 | Richards et al. |
| 6,954,480 B2 | 10/2005 | Richards et al. |
| 6,959,031 B2 | 10/2005 | Haynes et al. |
| 6,959,032 B1 | 10/2005 | Richards et al. |
| 6,961,285 B2 | 11/2005 | Niemiec et al. |
| 6,961,541 B2 | 11/2005 | Overy et al. |
| 6,963,727 B2 | 11/2005 | Shreve |
| 6,980,613 B2 | 12/2005 | Krivokapic |
| 6,989,751 B2 | 1/2006 | Richards |
| 7,002,473 B2 | 2/2006 | Glick et al. |
| 7,003,289 B1 | 2/2006 | Kolls |
| 7,010,290 B2 | 3/2006 | Dent |
| 7,015,793 B2 | 3/2006 | Gabig, Jr. et al. |
| 7,020,224 B2 | 3/2006 | Krivokapic |
| 7,026,983 B2 | 4/2006 | Spratt |
| 7,027,425 B1 | 4/2006 | Fullerton et al. |
| 7,027,483 B2 | 4/2006 | Santhoff et al. |
| 7,027,493 B2 | 4/2006 | Richards |
| 7,030,806 B2 | 4/2006 | Fullerton |
| 7,039,392 B2 | 5/2006 | McCorkle et al. |
| 7,042,417 B2 | 5/2006 | Santhoff et al. |
| 7,046,187 B2 | 5/2006 | Fullerton et al. |
| 7,046,618 B2 | 5/2006 | Santhoff et al. |
| 7,058,414 B1 | 6/2006 | Rofheart et al. |
| 7,069,111 B2 | 6/2006 | Glenn et al. |
| 7,075,476 B2 | 7/2006 | Kim |
| 7,079,827 B2 | 7/2006 | Richards et al. |
| 7,098,769 B2 | 8/2006 | Ott |
| 7,099,367 B2 | 8/2006 | Richards et al. |
| 7,099,368 B2 | 8/2006 | Santhoff et al. |
| 7,116,266 B1 | 10/2006 | Vesel et al. |
| 7,119,659 B2 | 10/2006 | Bonalle et al. |
| 7,129,886 B2 | 10/2006 | Hall et al. |
| 7,132,975 B2 | 11/2006 | Fullerton et al. |
| 7,139,647 B2 | 11/2006 | Larsen |
| 7,145,954 B1 | 12/2006 | Pendergrass et al. |
| 7,148,791 B2 | 12/2006 | Grisham et al. |
| 7,149,533 B2 | 12/2006 | Laird et al. |

(56) References Cited

U.S. PATENT DOCUMENTS

| | | | |
|---|---|---|---|
| 7,151,490 | B2 | 12/2006 | Richards |
| 7,167,525 | B2 | 1/2007 | Santhoff et al. |
| 7,170,408 | B2 | 1/2007 | Taylor et al. |
| 7,178,719 | B2 | 2/2007 | Silverbrook et al. |
| 7,181,192 | B2 | 2/2007 | Panasik et al. |
| 7,184,938 | B1 | 2/2007 | Lansford et al. |
| 7,188,244 | B2 | 3/2007 | Matsuno |
| 7,190,722 | B2 | 3/2007 | Lakkis et al. |
| 7,190,729 | B2 | 3/2007 | Siwiak |
| 7,200,566 | B1 * | 4/2007 | Moore et al. ............... 705/26.3 |
| 7,206,334 | B2 | 4/2007 | Siwiak |
| 7,206,559 | B2 | 4/2007 | Meade et al. |
| 7,209,724 | B2 | 4/2007 | Richards et al. |
| 7,209,753 | B2 | 4/2007 | Raith |
| 7,230,980 | B2 | 6/2007 | Langford et al. |
| 7,239,277 | B2 | 7/2007 | Fullerton et al. |
| 7,245,900 | B1 | 7/2007 | Lamb et al. |
| RE39,759 | E | 8/2007 | Fullerton |
| 7,256,727 | B2 | 8/2007 | Fullerton et al. |
| 7,271,779 | B2 | 9/2007 | Hertel |
| 7,277,715 | B2 | 10/2007 | Starr et al. |
| 7,308,356 | B2 | 12/2007 | Melaku et al. |
| 7,310,532 | B2 | 12/2007 | Knauerhase et al. |
| 7,363,494 | B2 | 4/2008 | Brainard et al. |
| 7,366,509 | B2 | 4/2008 | Akgun et al. |
| 7,383,984 | B2 | 6/2008 | Silverbrook et al. |
| 7,398,392 | B2 | 7/2008 | Weber |
| 7,505,443 | B2 | 3/2009 | McNew et al. |
| 7,554,979 | B2 | 6/2009 | Ikeda |
| 7,581,113 | B2 | 8/2009 | Smith et al. |
| 7,724,705 | B2 | 5/2010 | Erola et al. |
| 7,739,157 | B2 | 6/2010 | Bonner et al. |
| 7,783,532 | B2 | 8/2010 | Hsu et al. |
| 7,818,762 | B2 | 10/2010 | Liu et al. |
| 7,870,021 | B2 | 1/2011 | Mankoff |
| 7,870,229 | B2 | 1/2011 | Spector |
| 8,332,270 | B2 | 12/2012 | Sprigg et al. |
| 8,595,070 | B1 | 11/2013 | Barnes et al. |
| 2001/0014870 | A1 | 8/2001 | Saito et al. |
| 2001/0042010 | A1 | 11/2001 | Hassell |
| 2002/0002504 | A1 | 1/2002 | Engel et al. |
| 2002/0004783 | A1 | 1/2002 | Paltenghe et al. |
| 2002/0010627 | A1 | 1/2002 | Lerat |
| 2002/0046084 | A1 * | 4/2002 | Steele et al. ............... 705/14 |
| 2002/0065713 | A1 | 5/2002 | Awada et al. |
| 2002/0091569 | A1 | 7/2002 | Kitaura et al. |
| 2002/0091571 | A1 | 7/2002 | Thomas et al. |
| 2002/0107738 | A1 | 8/2002 | Beach et al. |
| 2002/0111140 | A1 | 8/2002 | Kim |
| 2002/0111907 | A1 | 8/2002 | Ling |
| 2002/0116271 | A1 | 8/2002 | Mankoff |
| 2002/0117544 | A1 | 8/2002 | Wolf et al. |
| 2002/0128903 | A1 | 9/2002 | Kernahan |
| 2002/0138345 | A1 | 9/2002 | Dickson et al. |
| 2002/0138346 | A1 | 9/2002 | Kodaka et al. |
| 2002/0169665 | A1 | 11/2002 | Hughes et al. |
| 2002/0169668 | A1 | 11/2002 | Bank et al. |
| 2002/0169892 | A1 | 11/2002 | Miyaoku et al. |
| 2002/0178060 | A1 | 11/2002 | Sheehan |
| 2002/0194303 | A1 | 12/2002 | Suila et al. |
| 2003/0004808 | A1 | 1/2003 | Elhaoussine et al. |
| 2003/0004821 | A1 | 1/2003 | Dutta et al. |
| 2003/0055726 | A1 | 3/2003 | Sohya et al. |
| 2003/0074259 | A1 | 4/2003 | Slyman, Jr. et al. |
| 2003/0093283 | A1 | 5/2003 | Morsa |
| 2003/0093314 | A1 | 5/2003 | Leung et al. |
| 2003/0108009 | A1 | 6/2003 | Petersen |
| 2003/0115152 | A1 | 6/2003 | Flaherty |
| 2003/0117635 | A1 | 6/2003 | Roberts |
| 2003/0158796 | A1 | 8/2003 | Balent |
| 2003/0195806 | A1 | 10/2003 | Willman et al. |
| 2003/0217153 | A1 | 11/2003 | Rao et al. |
| 2003/0233190 | A1 | 12/2003 | Jones |
| 2004/0054592 | A1 | 3/2004 | Hernblad |
| 2004/0054732 | A1 | 3/2004 | Carter et al. |
| 2004/0064351 | A1 | 4/2004 | Mikurak |
| 2004/0117250 | A1 | 6/2004 | Lubow et al. |
| 2004/0137886 | A1 | 7/2004 | Ross et al. |
| 2004/0143500 | A1 | 7/2004 | Lopez et al. |
| 2004/0156326 | A1 | 8/2004 | Chithambaram |
| 2004/0158490 | A1 | 8/2004 | Sakamura et al. |
| 2004/0158492 | A1 | 8/2004 | Lopez et al. |
| 2004/0203963 | A1 | 10/2004 | Shivaram et al. |
| 2004/0218574 | A1 | 11/2004 | Sata et al. |
| 2004/0222302 | A1 | 11/2004 | Matsumori |
| 2004/0233621 | A1 | 11/2004 | Maeoka et al. |
| 2004/0240565 | A1 | 12/2004 | Santhoff et al. |
| 2004/0243519 | A1 | 12/2004 | Perttila et al. |
| 2004/0254836 | A1 | 12/2004 | Emoke Barabas et al. |
| 2005/0004840 | A1 | 1/2005 | Wanninger |
| 2005/0027984 | A1 | 2/2005 | Saito et al. |
| 2005/0038574 | A1 | 2/2005 | Gila et al. |
| 2005/0040230 | A1 | 2/2005 | Swartz et al. |
| 2005/0114213 | A1 | 5/2005 | Smith et al. |
| 2005/0131761 | A1 | 6/2005 | Trika et al. |
| 2005/0132234 | A1 | 6/2005 | Dawson |
| 2005/0135304 | A1 | 6/2005 | Wentink et al. |
| 2005/0138576 | A1 | 6/2005 | Baumert et al. |
| 2005/0184145 | A1 | 8/2005 | Law et al. |
| 2005/0200671 | A1 | 9/2005 | Mistry et al. |
| 2005/0204152 | A1 | 9/2005 | Breitbach |
| 2005/0230473 | A1 | 10/2005 | Fajkowski |
| 2005/0237270 | A1 | 10/2005 | Adams et al. |
| 2006/0003776 | A1 | 1/2006 | Natori et al. |
| 2006/0014532 | A1 | 1/2006 | Seligmann et al. |
| 2006/0015404 | A1 | 1/2006 | Tran |
| 2006/0026070 | A1 | 2/2006 | Sun |
| 2006/0030341 | A1 | 2/2006 | Pham |
| 2006/0068822 | A1 | 3/2006 | Kalhan |
| 2006/0073851 | A1 | 4/2006 | Colando et al. |
| 2006/0074784 | A1 | 4/2006 | Brown |
| 2006/0111967 | A1 | 5/2006 | Forbes |
| 2006/0130100 | A1 | 6/2006 | Pentland |
| 2006/0177030 | A1 | 8/2006 | Rajagopalan et al. |
| 2006/0178932 | A1 | 8/2006 | Lang |
| 2006/0180664 | A1 | 8/2006 | Barrett et al. |
| 2006/0194569 | A1 | 8/2006 | Hsueh |
| 2006/0293968 | A1 | 12/2006 | Brice et al. |
| 2007/0017259 | A1 | 1/2007 | Cho et al. |
| 2007/0043626 | A1 | 2/2007 | Duvall et al. |
| 2007/0057051 | A1 | 3/2007 | Bortolin et al. |
| 2007/0061302 | A1 | 3/2007 | Ramer et al. |
| 2007/0087732 | A1 | 4/2007 | Hsueh |
| 2007/0124209 | A1 | 5/2007 | Walker et al. |
| 2007/0131759 | A1 | 6/2007 | Cox et al. |
| 2007/0136657 | A1 | 6/2007 | Blumenthal et al. |
| 2007/0136775 | A1 | 6/2007 | MacKay et al. |
| 2007/0138270 | A1 | 6/2007 | Reblin |
| 2007/0150339 | A1 | 6/2007 | Retter et al. |
| 2007/0173266 | A1 | 7/2007 | Barnes, Jr. |
| 2007/0174116 | A1 | 7/2007 | Keith et al. |
| 2007/0174259 | A1 | 7/2007 | Amjadi |
| 2007/0182546 | A1 | 8/2007 | Virk et al. |
| 2007/0200671 | A1 | 8/2007 | Kelley et al. |
| 2007/0203792 | A1 | 8/2007 | Rao |
| 2007/0241189 | A1 | 10/2007 | Slavin et al. |
| 2007/0249288 | A1 | 10/2007 | Moallemi et al. |
| 2007/0259690 | A1 | 11/2007 | Julian et al. |
| 2007/0270129 | A1 | 11/2007 | Luo |
| 2007/0276537 | A1 | 11/2007 | Walker et al. |
| 2007/0285306 | A1 | 12/2007 | Julian et al. |
| 2007/0287386 | A1 | 12/2007 | Agrawal et al. |
| 2008/0040229 | A1 | 2/2008 | Gholston |
| 2008/0052169 | A1 | 2/2008 | O'shea et al. |
| 2008/0072066 | A1 | 3/2008 | Vogler et al. |
| 2008/0074264 | A1 | 3/2008 | Sharpe et al. |
| 2008/0077484 | A1 | 3/2008 | Main et al. |
| 2008/0120186 | A1 | 5/2008 | Jokinen et al. |
| 2008/0133349 | A1 | 6/2008 | Nazer et al. |
| 2008/0133366 | A1 | 6/2008 | Evans et al. |
| 2008/0154714 | A1 | 6/2008 | Liu et al. |
| 2008/0154827 | A1 | 6/2008 | Connors |
| 2008/0167991 | A1 | 7/2008 | Carlson et al. |
| 2008/0189170 | A1 | 8/2008 | Ramachandra |

(56) References Cited

U.S. PATENT DOCUMENTS

| | | | |
|---|---|---|---|
| 2008/0208688 A1 | 8/2008 | Byerley et al. |
| 2008/0221984 A1 | 9/2008 | Abhyanker |
| 2008/0238615 A1 | 10/2008 | Carpenter |
| 2008/0240440 A1 | 10/2008 | Rose et al. |
| 2008/0262928 A1 | 10/2008 | Michaelis |
| 2008/0270231 A1 | 10/2008 | Li et al. |
| 2008/0300970 A1 | 12/2008 | Scheibe |
| 2008/0300984 A1 | 12/2008 | Li |
| 2009/0061884 A1 | 3/2009 | Rajan et al. |
| 2009/0076911 A1 | 3/2009 | Vo et al. |
| 2009/0076912 A1 | 3/2009 | Rajan et al. |
| 2009/0088182 A1 | 4/2009 | Piersol et al. |
| 2009/0098903 A1* | 4/2009 | Donaldson et al. ....... 455/552.1 |
| 2009/0108064 A1 | 4/2009 | Fernandes et al. |
| 2009/0164309 A1 | 6/2009 | Mgrdechian et al. |
| 2009/0178144 A1 | 7/2009 | Redlich et al. |
| 2009/0233575 A1 | 9/2009 | Morrison |
| 2010/0066498 A1 | 3/2010 | Fenton |
| 2010/0153205 A1 | 6/2010 | Retter et al. |
| 2010/0174615 A1 | 7/2010 | Weaver |
| 2010/0185504 A1 | 7/2010 | Rajan et al. |
| 2010/0205043 A1 | 8/2010 | Edwards |
| 2010/0241574 A1 | 9/2010 | Salazar |
| 2010/0257020 A1 | 10/2010 | Bryant et al. |
| 2010/0280960 A1 | 11/2010 | Ziotopoulos |
| 2010/0289640 A1 | 11/2010 | Annamalai |
| 2010/0299224 A1 | 11/2010 | Borom et al. |
| 2011/0028160 A1 | 2/2011 | Roeding et al. |
| 2011/0076948 A1* | 3/2011 | Jabara ................ H04L 12/5692 455/41.2 |
| 2011/0119132 A1 | 5/2011 | Morton et al. |
| 2011/0215138 A1 | 9/2011 | Crum |
| 2011/0250901 A1 | 10/2011 | Grainger et al. |
| 2011/0276385 A1 | 11/2011 | Keller |
| 2013/0006773 A1 | 1/2013 | Lutnick et al. |
| 2013/0030915 A1 | 1/2013 | Statler et al. |
| 2015/0017951 A1 | 1/2015 | Agrawal et al. |
| 2015/0024689 A1 | 1/2015 | Agrawal |

FOREIGN PATENT DOCUMENTS

| | | |
|---|---|---|
| CN | 1672382 | 9/2005 |
| CN | 1694122 A | 11/2005 |
| CN | 1716223 A | 1/2006 |
| CN | 1799061 A | 7/2006 |
| CN | 1879121 A | 12/2006 |
| CN | 101384031 A | 3/2009 |
| CN | 101731017 A | 6/2010 |
| EP | 1758308 A1 | 2/2007 |
| EP | 1926335 A1 | 5/2008 |
| EP | 2184927 A1 | 5/2010 |
| EP | 2090133 B9 | 10/2010 |
| JP | 11353555 A | 12/1999 |
| JP | 2000275328 A | 10/2000 |
| JP | 2001034658 A | 2/2001 |
| JP | 2001145785 A | 5/2001 |
| JP | 2001223712 A | 8/2001 |
| JP | 2001325507 A | 11/2001 |
| JP | 2002073666 A | 3/2002 |
| JP | 2002074131 A | 3/2002 |
| JP | 2002109237 A | 4/2002 |
| JP | 2002132886 A | 5/2002 |
| JP | 2002149945 A | 5/2002 |
| JP | 2002150102 A | 5/2002 |
| JP | 2002525641 A | 8/2002 |
| JP | 2002251555 A | 9/2002 |
| JP | 2002279274 A | 9/2002 |
| JP | 2002291047 | 10/2002 |
| JP | 2002374261 A | 12/2002 |
| JP | 2003006543 A | 1/2003 |
| JP | 2003023367 A | 1/2003 |
| JP | 2003051771 | 2/2003 |
| JP | 2003067606 A | 3/2003 |
| JP | 2003115001 A | 4/2003 |
| JP | 2003187140 A | 7/2003 |
| JP | 2003208381 A | 7/2003 |
| JP | 2003256705 A | 9/2003 |
| JP | 2003263582 A | 9/2003 |
| JP | 2004094543 A | 3/2004 |
| JP | 2004516989 A | 6/2004 |
| JP | 2004220522 A | 8/2004 |
| JP | 2004236166 A | 8/2004 |
| JP | 2004248215 A | 9/2004 |
| JP | 2004272463 A | 9/2004 |
| JP | 2004326303 A | 11/2004 |
| JP | 2004328542 A | 11/2004 |
| JP | 2004334885 A | 11/2004 |
| JP | 2004362470 A | 12/2004 |
| JP | 2005011318 A | 1/2005 |
| JP | 2005020350 A | 1/2005 |
| JP | 2005045756 A | 2/2005 |
| JP | 2005078173 A | 3/2005 |
| JP | 2005128903 A | 5/2005 |
| JP | 2005128965 A | 5/2005 |
| JP | 2005141686 A | 6/2005 |
| JP | 2005209114 A | 8/2005 |
| JP | 2005528016 A | 9/2005 |
| JP | 2005533316 A | 11/2005 |
| JP | 2005534260 A | 11/2005 |
| JP | 2006011806 A | 1/2006 |
| JP | 2006018511 A | 1/2006 |
| JP | 2006018824 A | 1/2006 |
| JP | 2006020004 A | 1/2006 |
| JP | 2006091355 A | 4/2006 |
| JP | 2006129000 A | 5/2006 |
| JP | 2006139431 A | 6/2006 |
| JP | 2006197458 | 7/2006 |
| JP | 2006227901 A | 8/2006 |
| JP | 2006246433 A | 9/2006 |
| JP | 2006295249 A | 10/2006 |
| JP | 2007025854 A | 2/2007 |
| JP | 2007502087 A | 2/2007 |
| JP | 2007072906 A | 3/2007 |
| JP | 2007133461 A | 5/2007 |
| JP | 2007201851 A | 8/2007 |
| JP | 2007213276 A | 8/2007 |
| JP | 2008225540 A | 9/2008 |
| JP | 2008293123 A | 12/2008 |
| JP | 2009104350 A | 5/2009 |
| JP | 2009188922 | 8/2009 |
| JP | 2010515168 A | 5/2010 |
| JP | 2013500538 A | 1/2013 |
| KR | 1020020068945 | 8/2002 |
| KR | 20020096946 A | 12/2002 |
| KR | 20030011744 A | 2/2003 |
| KR | 20030018741 A | 3/2003 |
| KR | 20040020309 A | 3/2004 |
| KR | 20040069122 A | 8/2004 |
| KR | 100512362 B1 | 9/2005 |
| KR | 20060014942 A | 2/2006 |
| KR | 20060018235 A | 2/2006 |
| KR | 20060064222 A | 6/2006 |
| KR | 20060124430 A | 12/2006 |
| KR | 20070016301 | 2/2007 |
| RU | 2150790 C1 | 6/2000 |
| RU | 2267156 C2 | 12/2005 |
| RU | 20050100782 | 2/2006 |
| RU | 2301450 C2 | 6/2007 |
| TW | I228364 | 2/2005 |
| TW | I252324 | 4/2006 |
| TW | I252628 | 4/2006 |
| TW | I252639 | 4/2006 |
| TW | I252671 | 4/2006 |
| WO | WO9613920 A1 | 5/1996 |
| WO | WO0178423 A1 | 10/2001 |
| WO | 0221478 | 3/2002 |
| WO | WO0225823 | 3/2002 |
| WO | 0250732 A1 | 6/2002 |
| WO | WO02054353 A1 | 7/2002 |
| WO | WO03107289 | 12/2003 |
| WO | 2004008276 A2 | 1/2004 |
| WO | WO-2004014037 A1 | 2/2004 |
| WO | 2005045455 A2 | 5/2005 |

(56) References Cited

FOREIGN PATENT DOCUMENTS

| WO | WO-2005064515 A1 | 7/2005 |
| WO | 2005110208 A1 | 11/2005 |
| WO | 2005122483 A1 | 12/2005 |
| WO | WO2006030341 | 3/2006 |
| WO | WO2006092772 A1 | 9/2006 |
| WO | 2007026745 A1 | 3/2007 |
| WO | WO2008027965 | 3/2008 |
| WO | 2008146576 A1 | 12/2008 |
| WO | WO2008157806 | 12/2008 |
| WO | WO-2009140438 A1 | 11/2009 |
| WO | WO-2010096617 A2 | 8/2010 |
| WO | WO-2011014292 A1 | 2/2011 |

OTHER PUBLICATIONS

Bardia Alavi, et al., "Indoor Geolocat ion Distance Error Modeling using UWB Channel Measurements" ,2005 IEEE 16th International Symposium on Personal, Indoor and Mobile Radio Communications, Sep. 11-15, 2005.

Blundo, C. et al.: "Secure E-Coupons," Electronic Commerce Research, vol. 5, No. 1, pp. 117-139, Kluwer, Dordrecth, NL, (Jan. 1, 2005), XP002380651, ISSN: 1389-5753, Section 8.4.

"Examples of Judging whether Business-Related Inventions are Patentable".
http://www.jpo.go.jp/tetuzuki/t_tokkyo/bijinesu/biz_pat_case.htm, 2003.
"Digital Watermarking Alliance", Oct. 19, 2006, 8 Pages, Retrieved from the Internet: URL: http://www.digitalwatermarkingalliance.org/faqs.asp [retrieved on Jul. 21, 2014].
Itao T., "Relationship Mechanism for Dynamic and User Preference-Aware Service Creation", Journal of the Information Processing Society of Japan, Japan, IPSJ, Mar. 15, 2003, vol. 44, No. 3, pp. 812-825.
Kirovski D., et al., "Spread Spectrum Watermarking of Audio Signals", IEEE Transactions on Signal Processing, vol. 51, No. 4, pp. 1020-1033, Apr. 2003.
Supplementary European Search Report—EP12756043—Search Authority—The Hague—Oct. 17, 2014.
International Search Report and Written Opinion—PCT/US2012/028778—ISA/EPO—Jun. 29, 2012.
Okazaki, "Eight Methods for Capitalizing on Access Log Analysis, which are Essential to SEO, Marketing and Redesign", Web Creators, NdN Corporation, Japan, Mar. 1, 2005, vol. 39, pp. 148-155.
Roumeliotis, T., "Five geofencing ideas for mobile marketing from brands and retailers," Mobile Commerce Daily, Jul. 16, 2010, 2 pages, Retrieved from http://www.mobilecommercedaily.com/five-geofencing-ideas-for-mobile-marketing-from-brands-and-retailers.

\* cited by examiner

USER IDENTIFICATION WITHIN A PHYSICAL MERCHANT LOCATION THROUGH THE USE OF A WIRELESS NETWORK

BACKGROUND

Cellular telephones and other "smart" devices have become ubiquitous in today's society. And, due to the inherent portability of most smart devices, a consumer's personal smart device may be easily taken with a person to almost any location. Consequently, a smart device, such as a smart phone, is not just a useful tool of communication but it may also be used as a tracking device.

This tracking feature of smart devices may benefit retailers. Retailers have long sought for ways to trend consumer habits and track customer behavior so that, ultimately, the gained knowledge could be exploited in the quest for increased sales. Not surprisingly, therefore, a number of systems and methods have sought to use the power of a consumer's smart device to provide retailers with useful information concerning the presence of potential customers.

Some systems and methods track a consumer's location using the global positioning system ("GPS") functionality of the consumer's smart phone. Presumably, if the GPS coordinates transmitted from the consumer's smart device correlate with the GPS coordinates of a retail establishment, then the retailer knows the consumer is in his store. With such knowledge, a retailer may strategically coordinate sales efforts. However, the location data generated by a typical GPS function is often not accurate enough to precisely determine if a consumer is physically present within a specific retail store or area.

Other systems and methods simply create incentives, such as frequent visitor points, for consumers to "check in" to particular establishments by employing the GPS functionality, or other signal transceiving functionality, embedded in a personal smart device. Systems and methods that create incentives for consumers to "check in" to a retail establishment with a smart device usually have this feature so that the consumer will purchase a good or service while present in the retail establishment.

Current systems and methods do not provide for accurate, concrete detection of a consumer's presence in an establishment or within specific regions of an establishment. Further, current systems and methods do not provide for targeted solicitation of a consumer whose presence in a predefined proximity/area has been verified. Accordingly, what is needed is a system and method for positively verifying a consumer's presence in a retail establishment such that customized, targeted sales efforts based on the consumer's preferences or habits may be pushed to the consumer's smart device in real time.

SUMMARY OF THE DISCLOSURE

A method and system are described for determining a location of a consumer within a retail establishment, or other geographical proximity, using a portable computing device ("PCD") such as, but not limited to, a mobile phone. Advantageously, the inventive system may leverage existing infrastructure, such as wireless routers, to assist the PCD and a remote server in communication with the PCD to determine a location of a consumer in possession of the PCD within a retail location. The system may comprise a PCD running a geo-network discovery ("GND") module, a server running a service set identifier ("SSID") verification and rules ("V/R") module, a telecommunications network and a wireless router configured to broadcast a unique SSID.

In an exemplary embodiment, a method for determining the location of a PCD comprises broadcasting a SSID from a wireless router such that the broadcast range of the wireless router defines a proximity, receiving the SSID at the PCD as a result of the PCD being in the defined proximity, transmitting over a cellular communications link the SSID to a remote server, receiving the SSID at the remote server, querying a database for the SSID to determine the physical location data of the wireless router, and determining that the location of the PCD is proximate to that of the wireless router.

In some embodiments, the wireless router may be coupled to the Internet, although Internet connectivity for the wireless router is not required in all embodiments. For example, in some embodiments, the PCD does not log into the WiFi network generated by the wireless router. In such an embodiment, the PCD only leverages the SSID generated by the wireless router to assist the server in determining the location of the PCD. Subsequently, the PCD may receive targeted ads or offers over a secure channel using the telecommunications network. In such an exemplary embodiment, one of ordinary skill in the art will recognize that the PCD may communicate with the server only over the aforementioned secure telecommunications network.

The GND module running on the PCD may receive an SSID from a WiFi network produced by the wireless router. Although SSIDs known in the art may be leveraged by some embodiments, it is envisioned that other embodiments may produce SSIDs comprising unique codes, hash keys, or other means useful for uniquely identifying the location of the wireless router which has broadcast the SSID The GND module may work with a V/R module comprising rules or algorithms received by the PCD over a secure telecommunications network. In such embodiments, the validation rules and algorithms may be used by the GND module to decode any encoded SSIDs produced by wireless routers within the system. In other embodiments, the V/R module may be used to verify that a received SSID is valid before transmitting the SSID over the telecommunications network to the server 100.

Upon receipt of an SSID from a PCD, a PCD management server may run or execute a V/R module that may, in some embodiments, decode the encoded SSID received from the mobile network from the PCD. Once decoded, the PCD management server may query the SSID against a table to determine the location of the wireless router associated with the SSID. Consequently, the location of the PCD proximate to the associated wireless router may be discovered. Once the location of the PCD is discovered, the PCD management server may push specific advertisements, targeted offers or the like to the consumer who is operating the PCD and who is adjacent or within range of the wireless router operating in a retail location.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed. Further, an "application" may be a complete program, a module, a routine, a library function, a driver, etc.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component.

One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone," "wireless communication device" and "wireless handset" are used interchangeably. With the advent of third generation ("3G") and fourth generation ("4G") wireless technology, greater bandwidth availability has enabled more portable computing devices with a greater variety of wireless capabilities. Therefore, a portable computing device ("PCD") may include a cellular telephone, a pager, a PDA, a smartphone, a navigation device, a tablet personal computer ("PC"), or a hand-held computer with a wireless connection or link.

Figure 1:
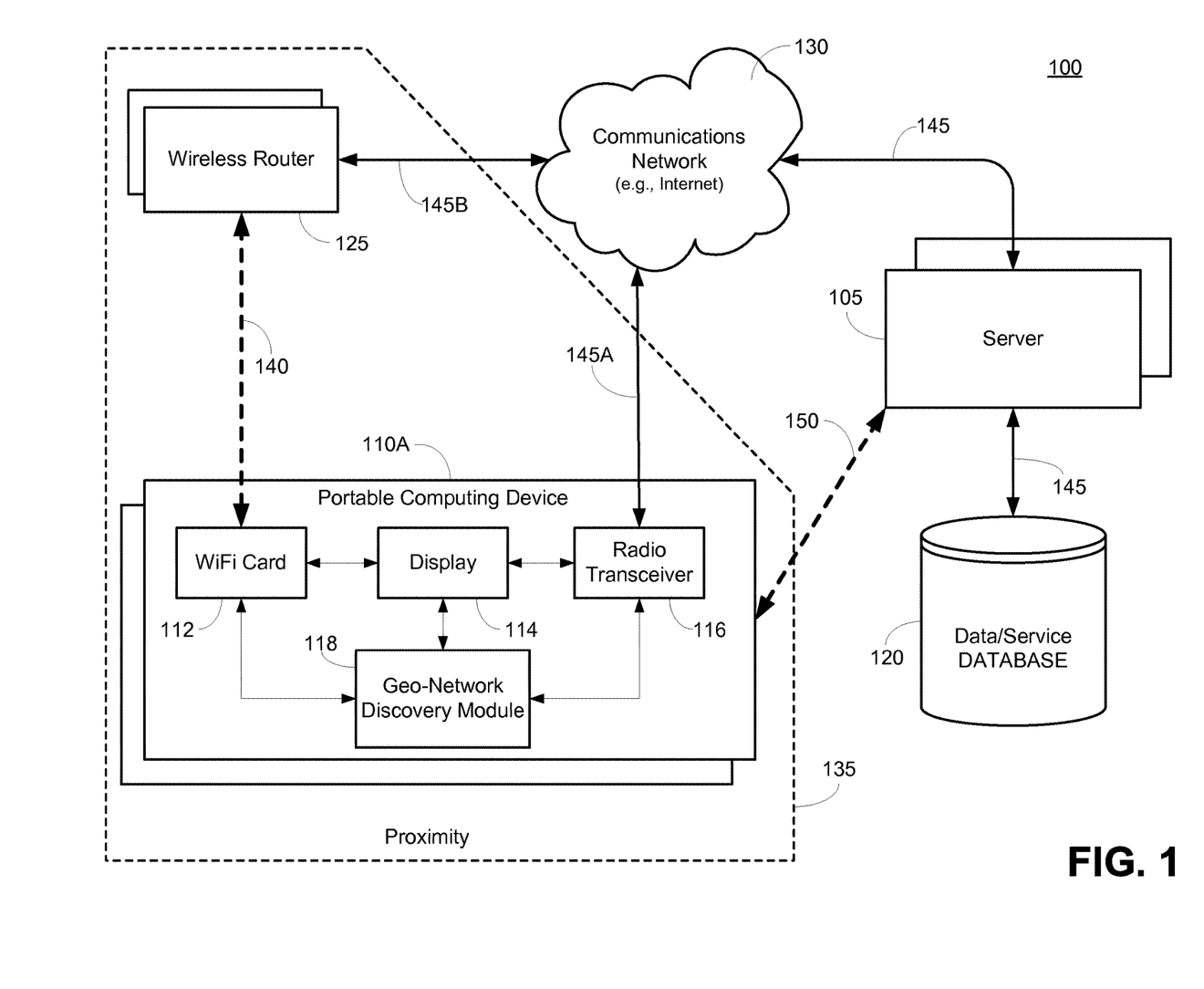
FIG. 1 is a high level diagram illustrating exemplary components of a system for leveraging wireless network discovery to identify a portable computing device user within a given proximity.

Referring to FIG. 1, a high level diagram illustrates exemplary components of a system 100 for leveraging wireless network discovery to identify a portable computing device user within a given proximity. The illustrated components of an exemplary system 100 recognize PCD 110 in a proximity 135 to wireless router 125, thereby verifying the presence of the PCD user within the proximity 135.

Leveraging system 100 to recognize the presence of a PCD 110 user in a proximity 135 to wireless router 125 has many useful applications. Briefly, and to provide the basis for an exemplary, non-limiting application scenario in which aspects of some embodiments of the disclosed systems and methods may be suitably described, consider a preferred customer entering a merchant establishment. The positive identification of the preferred customer within the merchant's establishment is valuable information for the merchant, as it opens up unique opportunities for the merchant to target sales efforts to the preferences of the identified customer.

To further the example, the merchant establishment, such as a storefront or other "brick and mortar" location, may be represented by proximity 135. A preferred customer for the merchant, known to have interest or a purchasing history of certain goods sold by the merchant, enters the merchant's store 135 with a cellular telephone, i.e. a portable computing device 110A, running a geo-network discovery ("GND") module 118. The wireless router 125 within the merchant's store 135 is broadcasting a unique service set identifier ("SSID") that is received by the customer's cell phone 110A and recognized by the GND module 118.

With the unique SSID recognized, the customer's cell phone 110A may transmit the SSID, or data extracted from the SSID, to a remote server 105. The remote server 105 may "look up" the SSID and determine that the SSID correlates to the merchant's storefront. Consequently, the presence of the PCD user, i.e. the preferred customer, may be verified as being within the merchant's store. Subsequently, special "deals" or other offers may be pushed by the server 105 back to the user of the PCD 110A in real time, based on the preferences, purchasing history, or other significant information associated with the customer.

Turning back to the FIG. 1 illustration, exemplary embodiments of a PCD 110, such as the PCD 110A illustrated in system 100 envision remote communication, real-time software updates, extended data storage, etc. and may be leveraged in various configurations by users of system 100. Advantageously, embodiments of PCDs 110 configured for communication via a computer system such as the exemplary system 100 depicted in FIG. 1 may leverage communications networks 130 including, but not limited to cellular networks, PSTNs, cable networks and the Internet for, among other things, software upgrades, content updates, database queries, data transmission, etc. Other data that may be useful in connection with a PCD 110, and accessible via the Internet or other networked system, will occur to one of ordinary skill in the art.

The illustrated computer system 100 may comprise a server 105 that may be coupled to a network 130 comprising any or all of a wide area network ("WAN"), a local area network ("LAN"), the Internet, or a combination of other types of networks.

It should be understood that the term server 105 may refer to a single server system or multiple systems or multiple servers. The server 105 may be coupled to a data/service database 120. The data/service database 120 may store various records related to, but not limited to, device configurations, software updates, user's manuals, troubleshooting manuals, user-specific PCD configurations, PCD user-specific contact or account information, subscriber-specific contact or account information, historical content, validation algorithms, filters/rules algorithms, audio/video data, etc.

When the server 105 is coupled to the network 130, the server 105 may communicate through the network 130 with various different PCDs 110 that may be comprised of desktop or laptop computers, thin clients, handheld devices such as personal digital assistants ("PDAs"), cellular telephones or other smart devices. Each PCD 110 may run or execute web browsing software or functionality to access the server 105 and its various applications. Any device that may access the network 130 either directly or via a tether to a complimentary device, may be a PCD 110 according to the computer system 100. The PCDs 110, as well as other components within system 100 such as, but not limited to, a database server (not specifically depicted) associated with data/service database 120 or wireless router 125, may be coupled to the network 130 by various types of communication links 145. These communication links 145 may comprise wired as well as wireless links. The communication links 145 allow each of the PCDs 110 to establish virtual links 150 with the server 105. While a virtual link 150 is depicted between the server 105 and PCD 110A, an actual wireless link 140 may exist between the PCD 110A and the router 125. This wireless link 140 may only be used to relay the SSID to the PCD 110A as a uni-directional communications channel. In other exemplary embodiments, the PCD 110A may establish bi-directional communications with the wireless router 125 as understood by one of ordinary skill in the art.

Each PCD 110 may include a display 114, wireless communication hardware 112, a radio transceiver 116 and a Geo-Network Discovery ("GND") module 118. It is envisioned that the display 114 may comprise any type of display device such as a liquid crystal display ("LCD"), a plasma display, an organic light-emitting diode ("OLED") display, a touch activated display, and a cathode ray tube ("CRT") display, a brail display, an LED bank, and a segmented display. A PCD 110 may execute, run or interface to a GND module 118. The GND module 118 may comprise a multimedia platform that may be part of a plug-in for an Internet web browser.

The GND module 118 is designed to work with wireless communication hardware 112, a radio transceiver 116 and any stored or retrievable content to recognize PCD presence in proximity 135. When PCD 110A is determined to be present within proximity 135, various content associated with the PCD user and proximity 135 may be rendered on the display 114. Based on detected wireless networks received by the GND module 118, the GND module 118 may run one or more algorithms or processes required for validation/authentication of an SSID prior to transmitting associated data to server 105.

Figure 2:
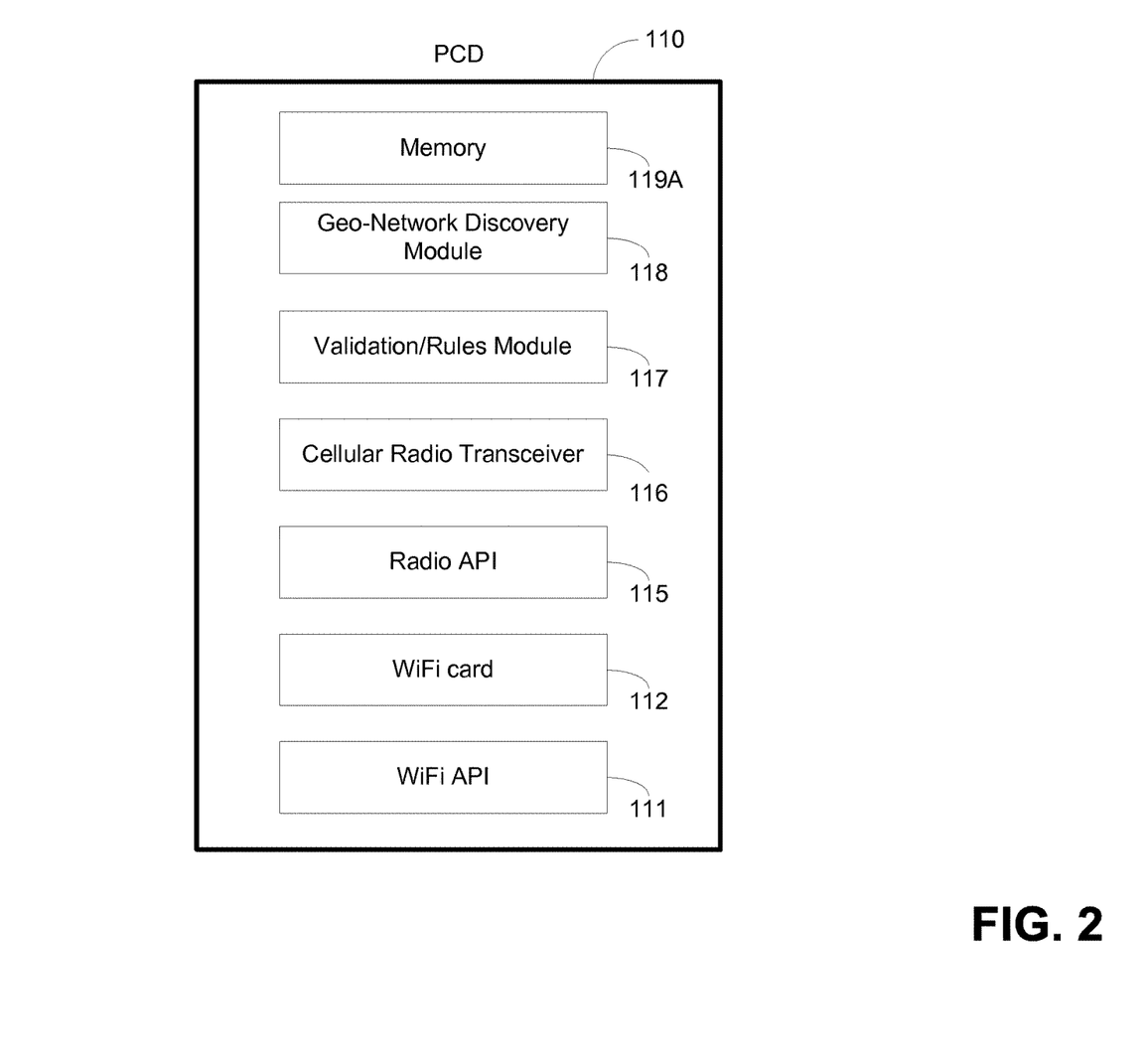
FIG. 2 is a functional block diagram illustrating exemplary aspects of a portable computing device that may be included in the FIG. 1 system.

Referring to FIG. 2, an exemplary portable computing device 110 may comprise wireless communication hardware 112 such as, but not limited to, a WiFi card. The PCD 110 may also comprise a Geo-Network Discovery ("GND") module 118 for receiving network identification information from the wireless communication hardware 112 such as, but not limited to, a Service Set Identifier network name ("SSID"). Wireless network identification information captured by the wireless communication hardware 112, such as a WiFi card, may have been received from a geographically proximate transmitter device such as, but not limited to, an exemplary wireless router 125 as depicted in the system 100 embodiment.

The GND module 118 may be configured to recognize wireless network identification information received from wireless communication hardware 112 via a WiFi application programming interface ("API") 111. As such, one of ordinary skill in the art will recognize that a GND module 118 may include the API 111 and/or wireless communication hardware 112. Further, the GND module 118 may be configured to interface with cellular radio transceiver 116, via API 115, to transmit received network identification information as well as other information to exemplary server 105, as depicted in the system 100 embodiment. Thus, one of ordinary skill in the art will also recognize that a GND module 118 may include the API 115 and/or cellular radio transceiver 116.

It is envisioned that a PCD 110 may be configured to leverage the cellular radio transceiver 116 to transmit data, such as a wireless network SSID or other data generated by GND module 118 that may be useful for identification of a geographical proximity by way of a secure channel using wireless link 145A to the server 105. It is also envisioned that PCDs 110 in some exemplary embodiments of system 100 may leverage communication link 145B via an unsecure or lesser secure wireless communication link 140 (relative to cellular wireless link 145A) that may be established between the router 125 and PCD 110 to transmit data to and from server 105.

Wireless link 145A may comprise a secure channel established on a cellular telephone network. Moreover, communication links 145, in general, may comprise any combination of wireless and wired links including, but not limited to, any combination of radio-frequency ("RF") links, infrared links, acoustic links, other wireless mediums, wide area networks ("WAN"), local area networks ("LAN"), the Internet, a Public Switched Telephony Network ("PSTN"), and a paging network.

The exemplary PCD 110 may also comprise a Validation/Rules module 117 for processing or filtering received network identification information prior to transmitting it to the server 105. Because a Validation/Rules module 117 is not required in all PCDs 110, the presence or absence of a Validation/Rules module 117 in a PCD 110 will not limit the scope of the disclosure. Even so, it is envisioned that some embodiments of system 100 will include PCDs 110 comprising a Validation/Rules module 117. Advantageously, in embodiments which include a PCD 110 has a Validation/Rules module 117, false network identification data may be recognized and/or filtered prior to communication with server 105.

An exemplary PCD 110 may also comprise a computer readable storage/memory component 119A for storing, whether temporarily or permanently, various data including, but not limited to, wireless network identification data as well as data added to, extracted or derived from wireless network identification data. Data added to, extracted or derived from the wireless network identification data may comprise a user ID, a transaction ID, a directory number ("DN") or calling line ID ("CLID") associated with PCD 110, a merchant ID, a network name, a hash value, a codec key, encryption or decryption data, account numbers and other account related data, etc.

Figure 3:
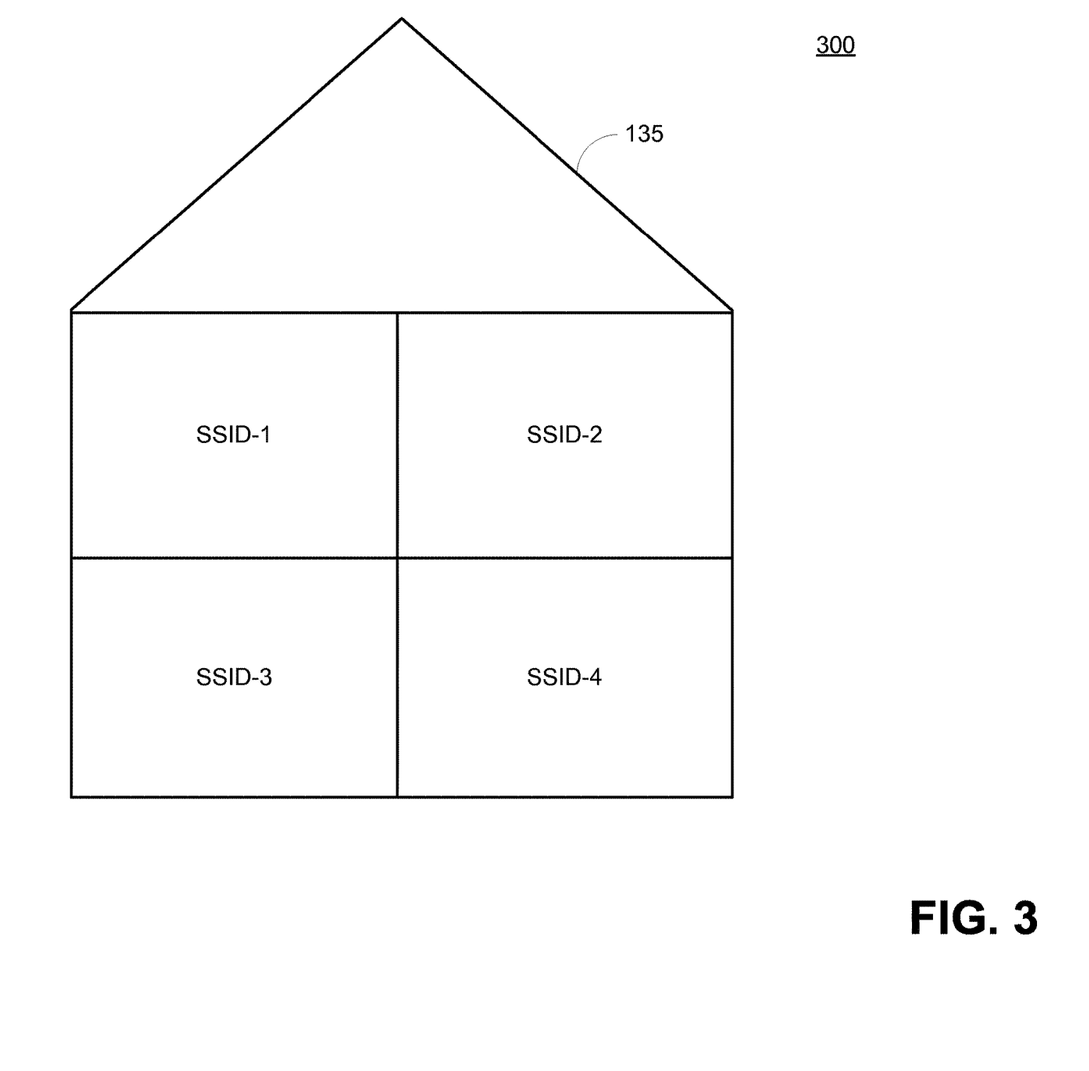
FIG. 3 is a diagram illustrating an exemplary embodiment of the FIG. 1 system featuring multiple wireless network devices transmitting unique network identification information in a common geographical proximity.

Referring to FIG. 3, this diagram illustrates an exemplary embodiment 300 of the FIG. 1 system featuring multiple wireless network devices 125 transmitting unique network identification information in a common geographical proximity 135. In the FIG. 3 embodiment of system 100, a physical proximity 135, such as a merchant storefront, may be advantageously subdivided into quadrants. Notably, although the FIG. 3 embodiment illustrates the geographical proximity 135 of system 100 being subdivided into quadrants, it is envisioned that a geographical proximity may be subdivided into any number of areas in the proximity and, as such, the depiction of quadrants in the FIG. 3 illustration should not be construed to limit the scope of the disclosure as understood by one of ordinary skill in the art.

Turning back to the FIG. 3 illustration, a geographical proximity 135, such as a large storefront, may be further narrowed into multiple, more specific, areas. As a non-limiting example, consider a large department store having multiple, disparate departments ranging from hardware located in a first area (SSID-1) to appliances located in a second area (SSID-2). Other departments may include house wares located in a third area (SSID-3) and clothing located in area (SSID-4). Using various embodiments of the methods described herein, one of ordinary skill in the art will recognize that a PCD 110 user may be positively identified as being present in any one of the various departments defined by the areas (SSID-N) illustrated in the drawing. More specifically, the unique network identification data associated with each department may be used to determine exactly where in the storefront 135 the customer is so that targeted solicitations associated with the given department may be pushed to the customer.

For example, an operator walking into area (SSID-1) may be provided with a unique offer or advertisement on PCD 110A for hardware products. Similarly, the same operator walking into area (SSID-2) may be provided with a unique offer for appliances on the PCD 110A.

Figure 4:
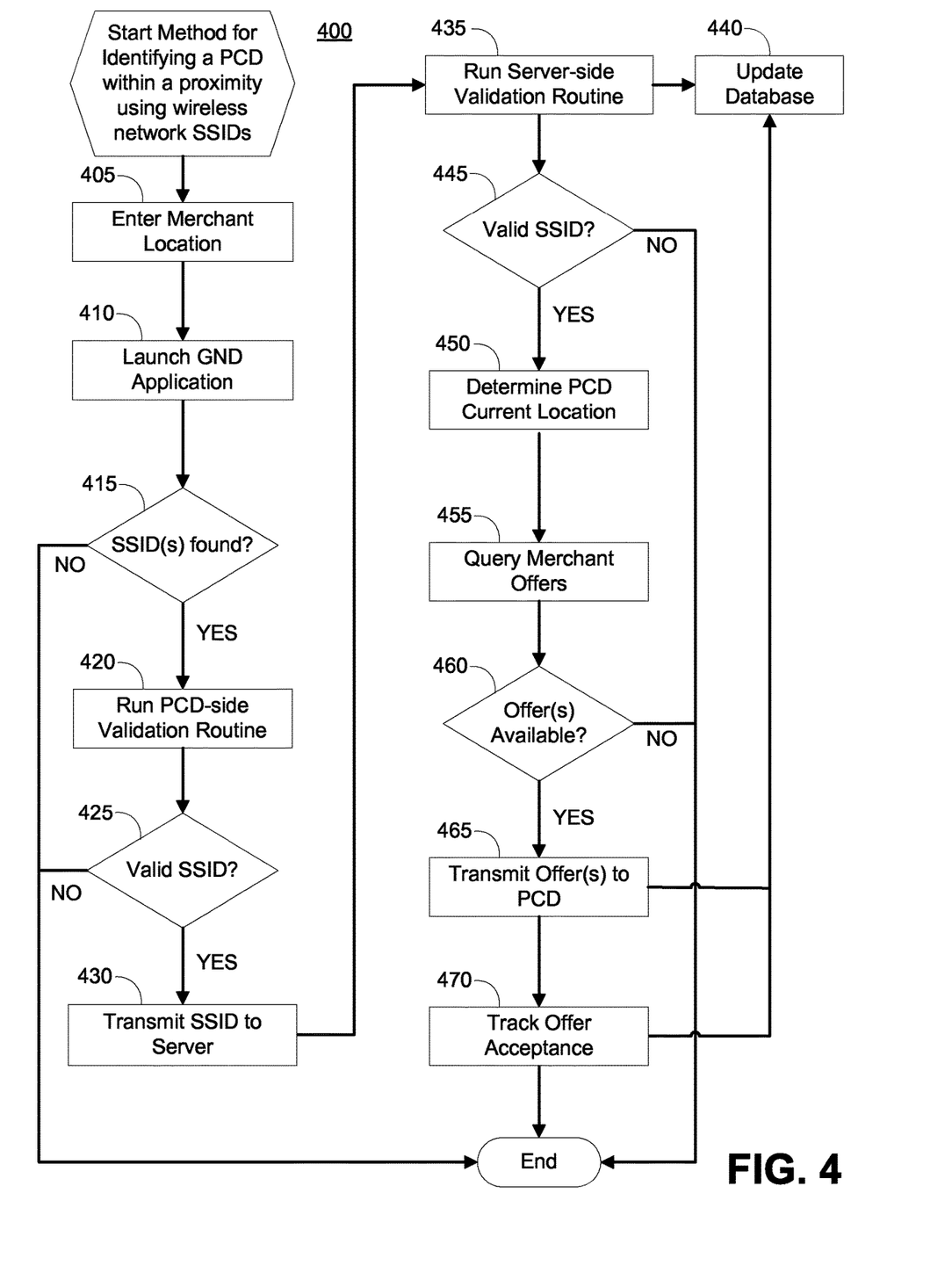
FIG. 4 illustrates an exemplary method for identifying a PCD within a geographical proximity through the use of wireless network identification information.

FIG. 4 illustrates an exemplary method 400 for identifying a PCD 110 within a geographical proximity 135 through the use of wireless network identification information. Step 405 is the first step of method 400. Furthering the general, non-limiting scenario offered above, at step 405 a customer having a PCD 110 enters a merchant location 135. Again, although it is convenient to describe various exemplary embodiments in the context of a merchant seeking to target sales efforts to a preferred customer who has entered his storefront, it will be understood that the systems and methods disclosed herein are not limited in application to customer presence verification in a retail establishment. For example, embodiments may applied in any number of scenarios where user presence coupled with unique historical user data may be advantageous to a third party in the same proximity such as, but not limited to, a wandering patient's medical data to a charge nurse in a hospital or a roaming guest's preferences to a staff member at a large hotel resort.

At step 410, a geo-network discovery ("GND") module 118 is launched on the customer's PCD 110 such that, at step 425, wireless network identification data (e.g., SSIDs) transmitted within storefront 135 may be recognized. At step 415, if GND module 118 does not detect any SSIDs, the exemplary embodiment 400 ends. Notably, one of ordinary skill in the art will recognize that "ending" the exemplary method 400 in the event that no SSIDs are discovered does not necessarily anticipate terminating the GND module 118 execution. Rather, it is envisioned that some embodiments of a PCD 110 running GND module 118 will continuously "search" for SSIDs such that the method essentially pauses or loops at step 415 unless and until an SSID is discovered.

If an SSID is detected by the PCD 110 at step 415, some embodiments of a PCD 110 may run at step 420 a validation and rules ("V/R") module 117 in an effort to detect false or invalid SSID data. In such embodiments, the processing capability of PCD 110 may be leveraged to filter out false, spoofed or otherwise invalid SSIDs detected by GND module 118. If no detected SSID is found valid at step 425, some embodiments may end the process while others may remain in a discover mode and return to step 415.

If an SSID is detected at step 415 and found valid at step 425, the GND module 118 may cause PCD 110 to transmit at step 430 the SSID data to server 105 using a secure communications channel, such as a mobile or cellular communication link 145A. As has been described, it is envisioned that some exemplary embodiments of a PCD 110 may employ a cellular communication link 145A to transmit the SSID data to server 105. However, it is also envisioned that in some exemplary embodiments the PCD 110 may communicate with the server 105 using the SSID transmitting device, such as wireless router 125, running radio transmission protocols such as BlueTooth, for example. This communication channel established over wireless link 140 between PCD 110 and the router 125 may be unsecured or less secure relative to the cellular telephone network link 145A between the network 130 and the PCD 110.

However, advantageously, by leveraging a local wireless connection 140 through wireless router 125 over an unsecured or less secure communications channel, increased data transmission speeds may be realized over the secured cellular transmission link 145A. Even so, one of ordinary skill in the art will recognize that not all embodiments of system 100 require the network identification data transmitting device, such as wireless router 125, to be "connected" to a communications network 125, much less the Internet. A wireless router 125 in some exemplary embodiments of system 100 will operate only to broadcast an SSID in a uni-directional manner to the PCD 110A and may not be coupled to any communications network 130.

Returning back to exemplary method 400 in the context of a preferred customer with an associated PCD 110 entering a merchant's storefront 135, at step 435 a server 105 may run a server-side validation routine (as opposed to the PCD-side routine of a V/R module that may be run at step 420 in some embodiments of a PCD 110). The information taken from the validation at step 435 may comprise, but is not limited to, frequency data representative of the number of times a particular SSID has been received by server 105, time of day, updated PCD user data transmitted along with the SSID, etc. This information from step 435 may be stored in database 120 at step 440.

If the received SSID is found invalid at step 445, for whatever reason, some embodiments may simply terminate the method while other embodiments may send notification back to PCD 110 for the benefit of the user. If the received SSID is found valid at step 445, then at step 450 the PCD 110 which transmitted the SSID to server 105 at step 430 may be located by querying database 120 to determine the geographical proximity of the wireless router device 125 associated with the SSID. Advantageously, because the geographic proximity associated with the wireless router 125 may be associated with the unique SSID broadcast by wireless router 125, the location of the PCD 110 user may be positively identified. As such, a preferred customer of a merchant may be identified in real time to be within the merchant's establishment or, in some embodiments, within a specific area (i.e. SSID-1 or SSID-2 as illustrated in FIG. 3) of the merchant's establishment which is uniquely associated with the SSID.

Further, some exemplary embodiments may couple other data such as, but not limited to, GPS information, hash keys, PINs, or encryption keys with SSID data in order to provide a layer of security to the method. Advantageously, in such exemplary embodiments that determine validity of an SSID based on other data coupled to the SSID, privacy invasion, spoofing, digital hijacking and other risks may be minimized. Other embodiments may not couple data with SSIDs but, rather, employ rules and filter algorithms in order to recognize duplicate, and thus phony, SSIDs. Still other embodiments may leverage encryption keys periodically updated by the server 105 and provided to the PCD 110 devices. Regardless, while some security features comprised within some embodiments may be novel in and of themselves, the presence or absence of any particular security measure, rule or algorithm will not be a limiting factor on the scope of the disclosure as understood by one of ordinary skill in the art.

At step 455, database 120 may be queried by the server 105 to identify offers or solicitations or coupons or discounts or other enticements authorized by the merchant for the benefit of the preferred customer. In some embodiments, an offer may be based on historical data associated with the customer. For example, suppose the customer entered the automotive department of a large department store seeking a quart of oil and, upon entering the department, the customer's PCD 110 detected and transmitted to server 105 the unique SSID being broadcast by a wireless router 125 in the automotive department. At step 455 the server 105 may query database 105 and determine that the customer last bought tires three years ago and that, on average, places 20,000 miles per year on his automobile.

Suppose further that the query may also indicate that the customer bought "60,000 mile tire-life" type tires three years ago. At step 460, the server 105 determines that the merchant has authorized a 20% discount to customers having a likely need for tires and, at step 465, the discount offer for tires is pushed to the customer's PCD 110. The offer may be documented in some embodiments at step 440.

Some exemplary embodiments may further integrate a merchant's point-of-sale system, or other system, to track the customer's rate of acceptance, whether such tracking be uniquely associated with a specific customer or more generally tracked as an aggregate customer trend. Regardless, in such exemplary embodiments, the acceptance or declination of a pushed offer may be tracked at step 470 and documented in database 120.

Figure 5:
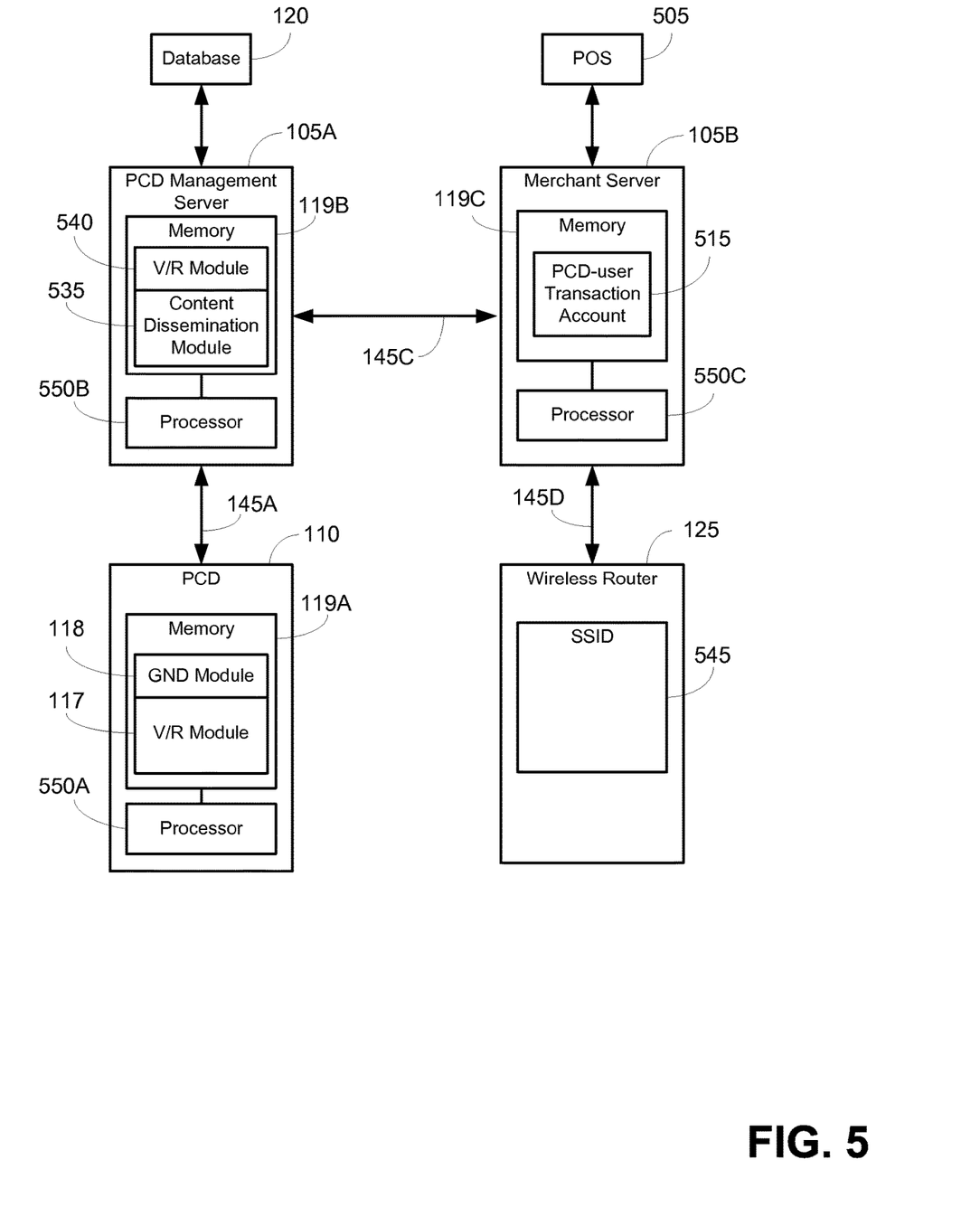
FIG. 5 is a diagram of exemplary computer architecture for the system of FIG. 1.

Turning now to FIG. 5, a diagram of exemplary computer architecture 101 for the system 100 of FIG. 1 is depicted. The exemplary architecture 101 may include a portable computing device ("PCD") 110. A portable computing device management server 105A may be connected to the PCD 110. The PCD management server 105A may be connected to the PCD 110 via a wireless communications link 145A, such as a mobile telephone network. Further, the PCD management server 105A may be connected to a subscriber or merchant server 105B via a direct communications link 145C, such as by a WAN. As noted previously, it should be understood that the term server 105 may refer to a single server system or multiple systems or multiple servers. One of ordinary skill in the art will appreciate that the various server arrangements may be selected depending upon computer architecture design constraints and without departing from the scope of the invention.

As illustrated in FIG. 5, the PCD 110 may include a processor 550A and a memory 119A coupled to the processor 550A. The memory 119A may include instructions for executing one or more of the method steps described herein. Further, the processor 550A and the memory 119A may serve as a means for executing one or more of the method steps described herein. As indicated, the memory 119A may also include a Geo-Network Discovery ("GND") module 118 and/or a Validation and Rules ("V/R") module 117. The GND module 118 and the V/R module 117 may be provided to the PCD 110 by the PCD management server 105A.

A GND module 118 operates to recognize wireless network identification data ("SSID") and transmit the data to the PCD management server 105A, thereby providing PCD management server 105A with a means for identifying the location of PCD 110 as being proximate to a wireless network device, such as a wireless router, that is associated with the transmitted SSID. A V/R module 117 operates to compare and process SSIDs received by PCD 110 in order to filter false or unrecognizable SSIDs prior to transmission by the GND module 118 to PCD management server 105A.

FIG. 5 shows that the PCD management server 105A may include a processor 550B and a memory 119B coupled to the processor 550B. The memory 119B may include instructions for executing one or more of the method steps described herein. Further, the processor 550B and the memory 119B may serve as a means for executing one or more of the method steps described herein. As illustrated, the memory 119B may include a V/R module 540 operable to compare and process SSIDs received from a PCD 110 in order to filter false or unrecognizable SSIDs. Further, as illustrated, the memory 119B may include a Content Dissemination ("CD") module 535 operable to transmit various contents to PCD 110 based on the received SSID data.

The V/R module 540 within the PCD management server 105A may be similar to the V/R module 117 stored within the PCD 110. Further, the V/R module 540 within the PCD management server 105A may include substantially the same logic as the V/R module 117 stored within the PCD 110. While a V/R module is not required in both a PCD 110 and a PCD management server 105A in all embodiments, it is envisioned that redundant filters and SSID recognition and validation algorithms may be implemented across V/R modules 117, 540 in some embodiments. A database 120 for storage of V/R algorithms, content for dissemination, SSID records, PCD user historical data, etc. may also be connected to the PCD management server 105A.

As depicted in FIG. 5, a subscriber or merchant server 105B may include a processor 550C and a memory 119C coupled to the processor 550C. The memory 119C may include instructions for one or more of the method steps described herein. Further, the processor 550C and the memory 119C may serve as a means for executing one or more of the method steps described herein. As illustrated, the memory 119C may include a PCD-user transaction account 515 associated with a user of a PCD 110.

A merchant's point of sale ("POS") system 505 may also be connected to the merchant server 105B such that PCD-user transaction data may be tracked and transmitted to the PCD management server 105A. Also, in some embodiments, a wireless router 125, in addition to transmission of an SSID 545, may be operable to provide a communication link 145D through merchant server 105B to PCD management server 105A. Advantageously, embodiments that include communication link 145D may provide a PCD 110 with an alternate communication path to PCD management server 105A, thus potentially alleviating the need for cellular communication link 145A.

Figure 6:
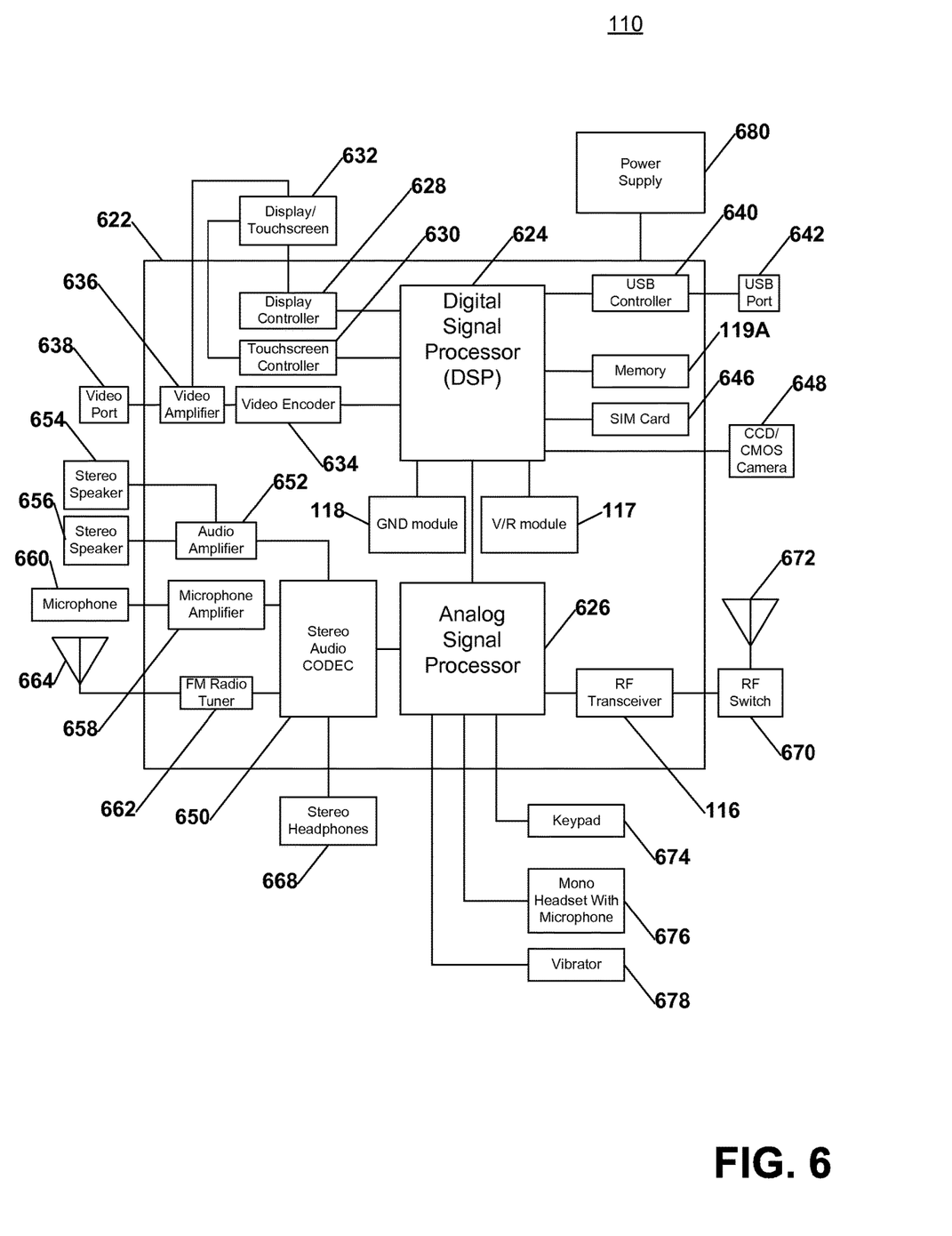
FIG. 6 is a diagram of an exemplary, non-limiting aspect of a portable computing device comprising a wireless telephone which corresponds with FIG. 2.

Referring to FIG. 6, this figure is a diagram of an exemplary, non-limiting aspect of a PCD 110 comprising a wireless telephone which corresponds with FIG. 2. As shown, the PCD 110 includes an on-chip system 622 that includes a digital signal processor 624 and an analog signal processor 626 that are coupled together. As illustrated in FIG. 6, a display controller 628 and a touchscreen controller 630 are coupled to the digital signal processor 624. A touchscreen display 632 external to the on-chip system 622 is coupled to the display controller 628 and the touchscreen controller 630.

FIG. 6 further indicates that a video encoder 634, e.g., a phase-alternating line ("PAL") encoder, a sequential couleur avec memoire ("SECAM") encoder, a national television system(s) committee ("NTSC") encoder or any other video encoder, is coupled to the digital signal processor 624. Further, a video amplifier 636 is coupled to the video encoder 634 and the touchscreen display 632. A video port 638 is coupled to the video amplifier 636. A universal serial bus ("USB") controller 640 is coupled to the digital signal processor 624. Also, a USB port 642 is coupled to the USB controller 640. A memory 119A and a subscriber identity module ("SIM") card 646 may also be coupled to the digital signal processor 624. Further, a digital camera 648 may be coupled to the digital signal processor 624. In an exemplary aspect, the digital camera 648 is a charge-coupled device ("CCD") camera or a complementary metal-oxide semiconductor ("CMOS") camera.

As further illustrated in FIG. 6, a stereo audio CODEC 650 may be coupled to the analog signal processor 626. Moreover, an audio amplifier 652 may be coupled to the stereo audio CODEC 650. In an exemplary aspect, a first stereo speaker 654 and a second stereo speaker 656 are coupled to the audio amplifier 652. FIG. 6 shows that a microphone amplifier 658 may be also coupled to the stereo audio CODEC 650. Additionally, a microphone 660 may be coupled to the microphone amplifier 658. In a particular aspect, a frequency modulation ("FM") radio tuner 662 may be coupled to the stereo audio CODEC 650. Also, an FM antenna 664 is coupled to the FM radio tuner 662. Further, stereo headphones 368 may be coupled to the stereo audio CODEC 650.

FIG. 6 further indicates that a radio frequency ("RF") transceiver 116 may be coupled to the analog signal processor 626. An RF switch 670 may be coupled to the RF transceiver 116 and an RF antenna 672. As shown in FIG. 6, a keypad 674 may be coupled to the analog signal processor 626. Also, a mono headset with a microphone 676 may be coupled to the analog signal processor 626.

Further, a vibrator device 678 may be coupled to the analog signal processor 626. Also shown is that a power supply 680 may be coupled to the on-chip system 622. In a particular aspect, the power supply 680 is a direct current ("DC") power supply that provides power to the various components of the PCD 110 that require power. Further, in a particular aspect, the power supply is a rechargeable DC battery or a DC power supply that is derived from an alternating current ("AC") to DC transformer that is connected to an AC power source.

FIG. 6 also shows that the PCD 110 may include a GND module 118 and/or a V/R module 117. As described above, the V/R module 117 may be operable to compare and process wireless network data detected by the RF antenna 672 and received by the transceiver 116, in order to filter false or unrecognizable wireless network data. Additionally, the GND module 118 may communicate with the PCD management server 105A to recognize and transmit wireless network identification data ("SSID"), thereby providing PCD management server 105A with a means for identifying the location of PCD 110 as being proximate to a wireless network device.

As depicted in FIG. 6, the touchscreen display 632, the video port 638, the USB port 642, the camera 648, the first stereo speaker 654, the second stereo speaker 656, the microphone 660, the FM antenna 664, the stereo headphones 668, the RF switch 670, the RF antenna 672, the keypad 674, the mono headset 676, the vibrator 678, and the power supply 680 are external to the on-chip system 622.

In a particular aspect, one or more of the method steps described herein may be stored in the memory 119A as computer program instructions. These instructions may be executed by the digital signal processor 624, the analog signal processor 626, or another processor, to perform the methods described herein. Further, the processors, 624, 626, the memory 119A, the instructions stored therein, or a combination thereof may serve as a means for performing one or more of the method steps described herein.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Also, in some instances, multiple actions depicted and described as unique steps in the present disclosure may be comprised within a single step. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another.

A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the spirit and scope of the present invention, as defined by the following claims.

What is claimed is:

1. A method for providing an electronic retail offer based on the location of a portable computing device ("PCD"), comprising the steps of:
   receiving from the PCD over a telecommunications network a service set identifier ("SSID") at a processor of a remote server, wherein:
      the SSID is broadcast from a physically stationary wireless router such that a broadcast range of the physically stationary wireless router defines a geographical region;
      the SSID is received at the processor of the remote server in response to the PCD physically entering the broadcast range of the physically stationary wireless router, receiving the SSID from the physically stationary wireless router and transmitting the SSID over the telecommunications network to the processor of the remote server; and
      the remote server is physically located outside the broadcast range of the physically stationary wireless router;
   determining with the processor of the remote sever if the received SSID is valid;
   querying a database with the processor of the remote server for the SSID, wherein the SSID is associated in the database with physical location data of the physically stationary wireless router;
   based on the physical location data of the physically stationary wireless router, determining that the physical location of the PCD is within the defined geographical region of the physically stationary wireless router; and
   the processor of the remote server transmitting a retail offer over the telecommunications network, wherein the offer is based on the physical location data of the wireless router.

2. The method of claim 1, further comprising the processor of the remote server decoding the SSID prior to querying the database.

3. The method of claim 1, further comprising:
   receiving over the telecommunications network a status of the retail offer; and
   updating the database to include records of the status of the retail offer.

4. The method of claim 1, further comprising:
   querying the database to identify data associated with the user of the PCD; and
   based on the physical location data of the wireless router and the identified data, transmitting over the telecommunications network a retail offer.

5. The method of claim 1, wherein the telecommunications network comprises a cellular network.

6. The method of claim 1, wherein the PCD comprises at least one of a cellular telephone, a pager, a personal digital assistant, a smartphone, a navigation device, a tablet personal computer, and a hand-held computer with a wireless connection or link.

7. A system for providing an electronic retail offer based on the location of a portable computing device ("PCD"), the system comprising:
   a remote server configured to:
      receive from the PCD over a telecommunications network a service set identifier ("SSID"), wherein:
         the SSID is broadcast from a physically stationary wireless router such that a broadcast range of the physically stationary wireless router defines a geographical region;
         the SSID is received by the remote server in response to the PCD physically entering the broadcast range of the physically stationary wireless router, receiving the SSID from the physically stationary wireless router and transmitting the SSID over the telecommunications network to the processor of the remote server; and
         the remote server is physically located outside the broadcast range of the physically stationary wireless router;
      determine if the received SSID is valid;
      query a database for the SSID, wherein the SSID is associated in the database with physical location data of the physically stationary wireless router;
      based on the physical location data of the physically stationary wireless router, determine that the physical location of the PCD is within the defined geographical region of the physically stationary wireless router; and
      transmit a retail offer over the telecommunications network, wherein the offer is based on the physical location data of the wireless router.

8. The system of claim 7, wherein the server is further configured to decode the SSID prior to querying the database.

9. The system of claim 7, wherein the server is further configured to:
   receive over the telecommunications network a status of the retail offer; and
   update the database to include records of the status of the retail offer.

10. The system of claim 7, wherein the server is further configured to:
    query the database to identify data associated with the user of the PCD; and
    based on the physical location data of the wireless router and the identified data, transmit over the telecommunications network a retail offer.

11. The system of claim 7, wherein the telecommunications network comprises a cellular network.

12. The system of claim 7, wherein the PCD comprises at least one of a cellular telephone, a pager, a personal digital assistant, a smartphone, a navigation device, a tablet personal computer, and a hand-held computer with a wireless connection or link.

13. A system for providing an electronic retail offer based on the location of a portable computing device ("PCD"), the system comprising:
- means for receiving from the PCD over a telecommunications network a service set identifier ("SSID") at a remote server, wherein:
  - the SSID is broadcast from a physically stationary wireless router such that a broadcast range of the physically stationary wireless router defines a geographical region;
  - the SSID is received in response to the PCD physically entering the broadcast range of the physically stationary wireless router, receiving the SSID from the physically stationary wireless router and transmitting the SSID over the telecommunications network to the processor of the remote server; and
  - the remote server is physically located outside the broadcast range of the physically stationary wireless router;
- means for determining if the SSID is valid;
- means for querying a database for the SSID, wherein the SSID is associated in the database with physical location data of the physically stationary wireless router;
- means for determining that the physical location of the PCD is within the defined geographical region of the physically stationary wireless router based on the physical location data of the physically stationary wireless router; and
- means for transmitting a retail offer over the telecommunications network, wherein the offer is based on the physical location data of the wireless router.

14. The system of claim 13, further comprising means to decode the SSID prior to querying the database.

15. The system of claim 13, further comprising means to:
- receive over the telecommunications network a status of the retail offer; and
- update the database to include records of the status of the retail offer.

16. The system of claim 13, further comprising means to:
- query the database to identify data associated with the user of the PCD; and
- based on the physical location data of the broadcasting means and the identified data, transmit over the telecommunications network a retail offer.

17. The system of claim 13, wherein the telecommunications network comprises a cellular network.

18. The system of claim 13, wherein the means for receiving the identification data comprises at least one of a cellular telephone, a pager, a personal digital assistant, a smartphone, a navigation device, a tablet personal computer, and a hand-held computer with a wireless connection or link.

19. A computer program product comprising a non-transitory computer usable medium having a computer readable program code embodied therein, said computer readable program code executable to implement a method for providing an electronic retail offer based on the location of a portable computing device ("PCD"), the method comprising:
- receiving from the PCD over a telecommunications network a service set identifier ("SSID") at a remote server, wherein:
  - the SSID is broadcast from a physically stationary wireless router such that a broadcast range of the physically stationary wireless router defines a geographical region;
  - the SSID is received at the remote server in response to the PCD physically entering the broadcast range of the physically stationary wireless router, receiving the SSID from the physically stationary wireless router and transmitting the SSID over the telecommunications network to the processor of the remote server; and
  - the remote server is physically located outside the broadcast range of the physically stationary wireless router;
- determining with the processor of the remote sever if the received SSID is valid;
- querying a database coupled to the remote server for the SSID, wherein the SSID is associated in the database with physical location data of the physically stationary wireless router;
- based on the physical location data of the physically stationary wireless router, determining that the physical location of the PCD is within the defined geographical region of the physically stationary wireless router; and
- transmitting a retail offer over the telecommunications network, wherein the offer is based on the physical location data of the wireless router.

20. The computer program product of claim 19, wherein the program code implementing the method further comprises decoding the SSID prior to querying the database.

21. The computer program product of claim 19, wherein the program code implementing the method further comprises:
- receiving over the telecommunications network a status of the retail offer; and
- updating the database to include records of the status of the retail offer.

22. The computer program product of claim 19, wherein the program code implementing the method further comprises:
- querying the database to identify data associated with the user of the PCD; and
- based on the physical location data of the wireless router and the identified data, transmitting over the telecommunications network a retail offer.

23. The computer program product of claim 19, wherein the telecommunications network comprises a cellular network communications link.

24. The computer program product of claim 19, wherein the PCD comprises at least one of a cellular telephone, a pager, a personal digital assistant, a smartphone, a navigation device, a tablet personal computer, and a hand-held computer with a wireless connection or link.

* * * * *